US007495405B2

(12) United States Patent
Sugiura (10) Patent No.: US 7,495,405 B2
(45) Date of Patent: Feb. 24, 2009

(54) PINCHING DETECTION DEVICE

(75) Inventor: Takehiko Sugiura, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 423 days.

(21) Appl. No.: 11/211,474

(22) Filed: Aug. 26, 2005

(65) Prior Publication Data

US 2006/0053904 A1 Mar. 16, 2006

(30) Foreign Application Priority Data

Aug. 27, 2004 (JP) ............................. 2004-249189

(51) Int. Cl.
G05B 5/00 (2006.01)

(52) U.S. Cl. .................. 318/466; 318/626; 318/471; 318/266

(58) Field of Classification Search ................. 318/626, 318/652, 283, 286, 466–468, 470, 266, 471
See application file for complete search history.

(56) References Cited

U.S. PATENT DOCUMENTS

| 4,701,684 | A | * | 10/1987 | Seidel et al. ................. 318/282 |
| 5,088,326 | A | * | 2/1992 | Wada et al. ............... 73/514.34 |
| 5,729,104 | A | * | 3/1998 | Kamishima et al. ......... 318/446 |
| 6,081,088 | A | | 6/2000 | Ishihara et al. |
| 6,747,399 | B1 | * | 6/2004 | Ogino et al. ................. 310/330 |
| 6,798,158 | B2 | * | 9/2004 | Evans .......................... 318/266 |
| 7,242,162 | B2 | * | 7/2007 | Goth .......................... 318/480 |
| 7,248,987 | B2 | * | 7/2007 | Sugiura ...................... 702/117 |
| 2006/0131915 | A1 | * | 6/2006 | Ogino et al. .................. 296/76 |

FOREIGN PATENT DOCUMENTS

| JP | 3300660 | 4/2002 |
| JP | 2003-106048 | 4/2003 |
| JP | 3415014 | 4/2003 |

* cited by examiner

*Primary Examiner*—Bentsu Ro
*Assistant Examiner*—Thai Dinh
(74) *Attorney, Agent, or Firm*—Buchanan Ingersoll & Rooney PC (57) ABSTRACT

A pinching detection device for detecting that an object has been pinched in an opening/closing apparatus. The device includes a sensor having temperature dependence and detecting that an object has been pinched, based on a frequency element and a magnitude of an output signal; a filter portion for extracting a signal in a predetermined frequency band, from an output of the sensor; and an amplification portion for amplifying the extracted signal. In this device, the frequency band and an amplification factor of the amplification portion is determined in response to an ambient temperature.

18 Claims, 5 Drawing Sheets

CUTOFF FREQUENCY fc = 1/(2πCfR)

AMPLIFICATION FACTOR $Av = -\dfrac{Rf}{Rs}$

PINCHING DETECTION DEVICE

CROSS REFERENCE TO RELATED APPLICATIONS

This application is based on and claims priority under 35 U.S.C. § 119 to Japanese Patent Application 2004-249189, filed on Aug. 22, 2004, the entire content of which is incorporated herein by reference.

FIELD OF THE INVENTION

The present invention relates to a pinching detection device for detecting that an object has been pinched in an opening/closing apparatus.

BACKGROUND OF THE INVENTION

Automatic doors in buildings, and electric sliding doors for vehicles such as wagons and vans have an electromotive opening/closing device that slides a door by a motor or the like. Such electromotive opening/closing devices may pinch an object between a door frame and a door during door closing operation. Accordingly, electromotive opening/closing devices have been proposed that have control means detecting the pinching of an object and stopping a door closing operation, or changing the door closing operation to the door opening operation.

Japanese Patent No. 3300660 and Japanese Patent No. 3415014 disclose an automatic opening/closing device that provides pinching detecting function such as a door panel of an electric sliding door for vehicle has pinched an object between the moving door panel and a door frame. The automatic opening/closing device disclosed in each of these prior arts has a pressure sensitive sensor for detecting a pressing force caused by pinching of an object. This pressure sensitive sensor is formed by providing a cross hole inside an outer skin portion of a long tubes formed of an elastic material. The cross hole is gradually displaced around the center of the tube in the longitudinal direction of the tube and a plurality of conductive wires serving as electrodes are placed so as to be spaced from one another through the cross hole in the vicinity of the center of the cross hole, in a spiral manner along the cross hole.

Once the pressure sensitive sensor has been subjected to a pressing force by pinching of an object, the outer skin portion is elastically deformed, and thereby the cross hole inside the outer skin portion is squashed. Any or all of the plurality of conductive wires along the cross hole contact one another and make electric continuity therebetween. Thus, the pressure sensitive sensor detects pinching of the object by detecting this electric continuity.

However, when attempting to arrange this pressure sensitive sensor along a door frame, and the flexibility in the installation may be restricted because of pressure applied bending or setting undergoing the sensor itself.

A possible countermeasure against this problem would be to use a pressure sensitive sensor using a piezoelectric element, instead of a pressure sensitive sensor with the above-described conductive wires as a detection principle. The piezoelectric element detects an external force that is being applied, not based on the physical contact between conductive wires inside the sensor as in the pressure sensitive sensor in the above-described prior arts, but based on electric polarization generated in response to an external (stress). Therefore, the pressure sensitive sensor using a piezoelectric element allows installation to a variety of places irrespective of installing methods.

Also, this type of pressure sensitive sensor starts to generate a voltage from a time when an external force is weak, such as an initial stage of a pinching process, an early detection is feasible. Japanese Patent Application Publication No. 2003-106048 discloses a technique by which this type of pressure sensitive sensor is applied to a hatchback door of an automobile.

In general, the piezoelectric element varies detection voltage significantly in response to variations of ambient temperature. Therefore, when it is used for pinching detection for an automatic door of a building, the detection voltage would vary due to variations of air temperature in seasons, variations of air temperature in a day, variations of ambient temperature due to solar irradiation, and so on. In particular, when attempting to apply the pressure sensitive sensor using this piezoelectric element for pinching detection of a sliding door for vehicle, the variation range of ambient temperature of working condition becomes more significant. Thus, the variations in detection voltage due to ambient temperature causes a serious problem.

SUMMARY OF THE INVENTION

Accordingly, the present invention is directed to solving the above-described problem. Specifically, the present invention is directed to a pinching detection device capable of detecting pinching of an object in a stable manner irrespective of variations in ambient temperature.

According to the present invention, there is provided a pinching detection device for detecting that an object has been pinched in an opening/closing apparatus. The device includes a detection sensor having temperature dependence and detecting that an object has been pinched, based on a frequency element and a magnitude of an output signal; a filter portion for extracting a signal in an predetermined frequency band, from an output of the sensor; and an amplification portion for amplifying the extracted signal. In this device, at least either of the frequency band and an amplification factor of the amplification portion is determined in response to an ambient temperature.

The sensor having temperature dependence, for example, the piezoelectric sensor is a sensor taking advantage of electrical polarization of a substance due to the piezoelectric effect, and detects an applied external force based on a frequency and a magnitude of the voltage of a voltage signal generated by electric polarization. Substances having the piezoelectric effect of the piezoelectric sensor, for example, crystals such as quartz crystal, lead zirconate titanate, and barium titanate generally exhibit a pyroelectric property as well as the piezoelectric effect. The piezoelectric sensor, therefore, has a high temperature dependence regarding its output. However, according the above-described features, at least either of the frequency band extracted by a filter and the amplification factor of the amplification portion is determined in response to an ambient temperature. Specifically, because at least either of the frequency band and the amplification factor is changed in response to the change in ambient temperature, the temperature dependence thereof is cancelled out to satisfactorily make compensation, thereby allowing the inhibition of their variations. Of course, both of the frequency band and the amplification factor may be changed in response to the ambient temperature, and it is desirable to make temperature compensation, particularly in accordance with the temperature dependence in their respective circuits.

The frequency band is determined by a combination of any two or all of a resistance value of a resistive element, a capacitance of a capacitive element, and an inductance of an inductive element, and the frequency band is determined in response to the ambient temperature. In order to determine the frequency band in response to the ambient temperature, it is recommended to perform the following:

a) constructing the resistive element by a resistive element of which the resistance value varies in response to the ambient temperature;

b) constructing the capacitive element by a capacitive element of which the capacitance value varies in response to the ambient temperature;

c) constructing the inductive element by an inductive element of which the inductance value varies in response to the ambient temperature; or d) combining any two or all of the above-described items (a), (b), and (c).

The filter circuit for extracting a signal in a specified frequency band can be constructed by combining a resistive element, capacitive element, and inductive element. For example, a low-pass filter for extracting a signal at frequency lower than a cutoff frequency can be predetermined by connecting a resistor (resistive element) in series, and a capacitor (capacitive element) in parallel, with a signal output of the sensor. When the temperature characteristic of the sensor is such that the frequency decreases as the ambient temperature increases, the use of a resistor such that the resistance value thereof increases as the ambient temperature increases, makes it possible to lower the cutoff frequency of the low-pass filter, following the frequency band of the sensor output that has been lowered as the temperature increase. The filter to be used is not limited to a low-pass filter, but a band-pass filter or the like may also be used. Possible filters to be used include various combinations in response to a circuit characteristic, such as a combination of a resistor and inductor, a combination of a capacitor and inductor, and besides the combination of resistor and capacitor. The frequency band can be determined by making any of or a plurality of the above-described (resistor, capacitor, and inductor) elements that vary in values (resistance value, capacitance value, and inductance value) in response of the ambient temperature. This temperature compensation is suitably made.

The above-described amplification factor is determined by the resistance value of a resistive element of which the resistance value varies in response to the ambient temperature.

The amplification factor of an amplifier circuit (amplification portion) is determined by a combination of resistors (resistive elements). Therefore, as in the case of the above-described determination of the frequency band, selecting the amplification factor by resistive elements of which the resistance value varies in response to the ambient temperature, makes it possible to cancel out the influence of variations in the sensor output and make temperature compensation.

The frequency band is determined by a combination of a resistance value of a resistive element of which the resistance value varies in response to the ambient temperature, and a capacitance of a capacitive element. Also, the amplification factor is determined by a resistance value of a resistive element of which the resistance value varies in response to the ambient temperature.

As described above, the amplification factor of the amplifier circuit (amplification portion) is determined by a combination of resistors (resistive elements). The filter portion is composed of capacitor (capacitive element) and resistor (resistive element). Using the resistive element, which is common element between the amplification portion and filter portion, and an element of which the resistance values varies in response to the ambient temperature. In consequence, temperature compensation performance of the amplification portion and filter portion can be conveniently and collectively managed. Also, as using resistors having temperature dependence, it is improved in availability of components and productivity.

As resistive elements, it is preferably used thermistors. The thermistor is also referred to as a "thermo-sensitive resistor", and it is a resistor of which the resistance value significantly varies with the variation in temperature. The temperature coefficients of thermistors include positive one and negative one. The former corresponds to the case where the resistance value increases as the ambient temperature increases, while the latter corresponds to the case where the resistance value decreases as the ambient temperature increases. Also, some of the resistance values of thermistors linearly change with respect to temperature, and others of them exponentially change with respect to temperature. Thermistors that are more often utilized as detection sensors have better correlation between the temperature and the resistance value thereof, and hence such thermistors can be easily fitted to the characteristics of the filter portion and amplification portion.

The detection sensor having temperature dependence, and detecting that an object has been pinched, based on a frequency element and a magnitude of an output signal, is a piezoelectric sensor including a first electrode, a second electrode, and a piezoelectric material sandwiched between the two electrodes.

The piezoelectric sensor is a sensor utilizing the electric polarization by the piezoelectric effect, and detects an applied external force, based on a frequency and a magnitude of voltage of a voltage signal generated by electric polarization. The piezoelectric sensor has a simple structure, and is superior in mass-productivity, as well as its signal circuit for processing outputs is simple in constitution and easy to use. Furthermore, because the piezoelectric sensor starts to generate a voltage from a time when an external force is weak, such as an initial stage of a pinching process, an early detection is feasible. It is therefore possible to cope with the pinching before a force applied to the pinched object grow, so that the piezoelectric sensor is suitable to a sensor used for a pinching detection device. A substance having the piezoelectric effect of the piezoelectric sensor, such as a crystal of barium titanate exhibits pyroelectric property as well as piezoelectric effect, and is used also as a material of a thermistor, which is a resistor of which the resistance value significantly varies with the variation in temperature. Hence, it is also possible to construct a sensor for detecting the external force due to pinching, and a temperature detecting element in a temperature compensating circuit for compensating for the temperature dependence of this sensor, using a substance having the same property, for each of the temperature detecting element and temperature compensating circuit.

In the pinching detection device according to the present invention, the piezoelectric sensor is formed into a coaxial cable concentrically provided with a center electrode as the first electrode, an outer electrode as the second electrode, and the piezoelectric material sandwiched between the two electrodes.

According to this feature, since the piezoelectric sensor is provided into a coaxial cable, it is easily formed a long figured sensor. Even the piezoelectric sensor can be installed along a bended door frame or door for a vehicle.

At the time of arrangement also, the piezoelectric sensor is subjected to no influence of bending or pressure applied when installed, thus allowing a pinching detection device to be satisfactorily constructed.

When attempting to form the piezoelectric sensor as a coaxial cable, typically, the piezoelectric material is constructed as a piezoelectric layer by combining resin or the like and piezoelectric ceramic or the like. As a result, when the rigidity of the piezoelectric layer including resin varies due to the ambient temperature, the way of external force application to the piezoelectric sensor varies. Therefore, the output of the coaxial cable shaped piezoelectric sensor easily varies in response to the variation in temperature. However, as described above, in the present invention, since the frequency band extracted by the filter portion and the amplification factor of the amplification portion are determined in response to the ambient temperature, it is possible to cancel out the temperature dependence to make good temperature compensation, and to inhibiting the above-described variation in the sensor output.

DESCRIPTION OF THE PREFERRED EMBODIMENTS

Figure 7A:
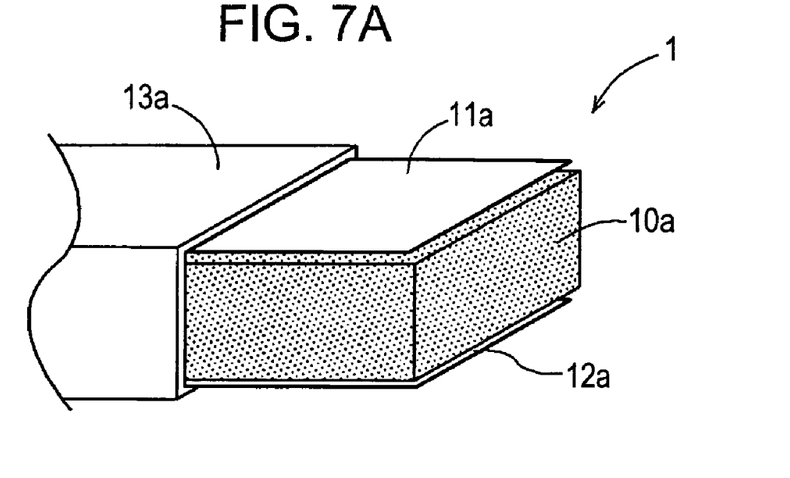
FIGS. 7A and 7B are schematic views each showing a configuration example of a piezoelectric censor.
Figure 7B:
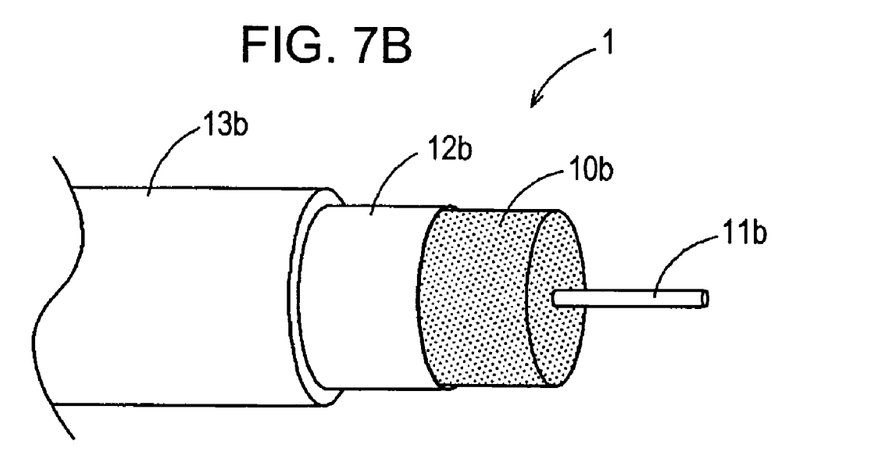

Hereinafter, an embodiment wherein the present invention is implemented by using a piezoelectric sensor will be described with reference to the accompanying drawings. FIGS. 7A and 7B are schematic views showing configuration examples of the piezoelectric sensor 1. FIG. 7A shows a configuration example of the piezoelectric sensor 1 comprising a plane-shaped first electrode 11a, a plane-shaped second electrode 12a and a piezoelectric material 10a sandwiched therebetween. In this embodiment, the piezoelectric sensor 1 is formed a flat cord entirely covered with a cladding 13a so as to install a long length portion such as a door or door frame. On the other hand, FIG. 7B shows a configuration example of the piezoelectric sensor 1 comprising a first electrode 11b formed by winding a conductive material around a conductive wire or a core, a tubular second electrode 12b, and a piezoelectric material 10b inserted therebetween, and the piezoelectric sensor 1 is formed into a coaxial cable entirely covered with a cladding 13b. As compared with the flat cord example shown in FIG. 7A, this example has a shape allowing easier installation to bended places. Here, the two examples have been shown, but the piezoelectric sensor 1 using a piezoelectric element (piezoelectric material) is not limited these shapes.

Figure 1:
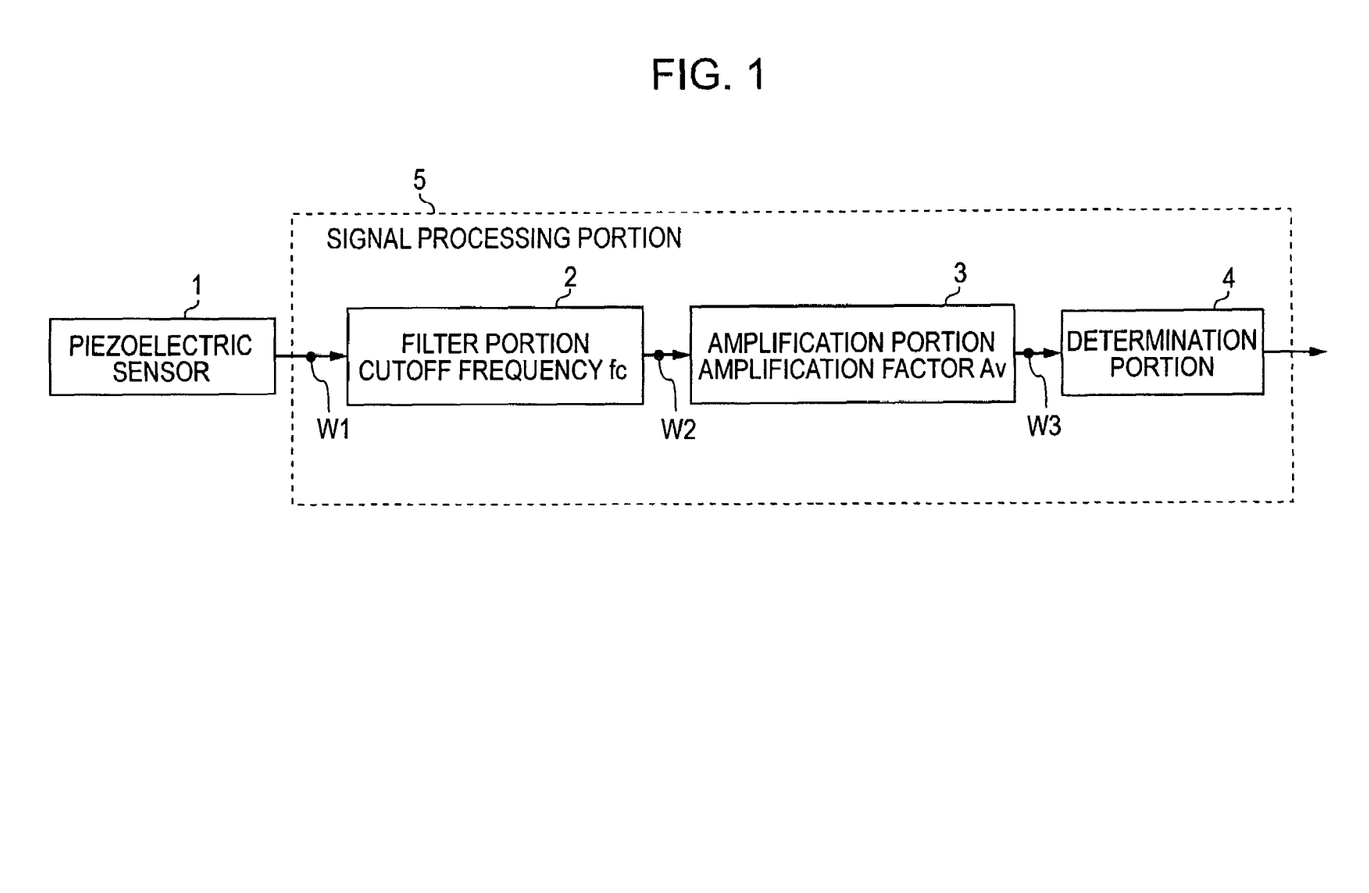
FIG. 1 is a schematic block diagram showing signal processing in a pinching detection device according to an embodiment of the present invention.

FIG. 1 is a schematic block diagram showing signal processing in the pinching detection device according to an embodiment of the present invention. This pinching detection device is for detecting that an object has been pinched in an opening/closing apparatus, such as an automatic door, an electric sliding door for a vehicle, or the like. As shown in FIG. 1, the pinching detection device includes a piezoelectric sensor 1 for outputting a signal based on the piezoelectric effect under an external force due to vibrations or shocks, and a signal processing portion 5 that signal processes an output from the piezoelectric sensor 1 and that determines whether an assumed pinching has occurred. The signal processing portion 5 includes a filter portion 2 for extracting a signal in a predetermined frequency band from an output of the piezoelectric sensor 1; an amplification portion 3 for amplifying the extracted signal in the filter portion 2; and a determination portion 4 for evaluating the amplified signal and determining that whether the assumed pinching has occurred.

Figure 2:
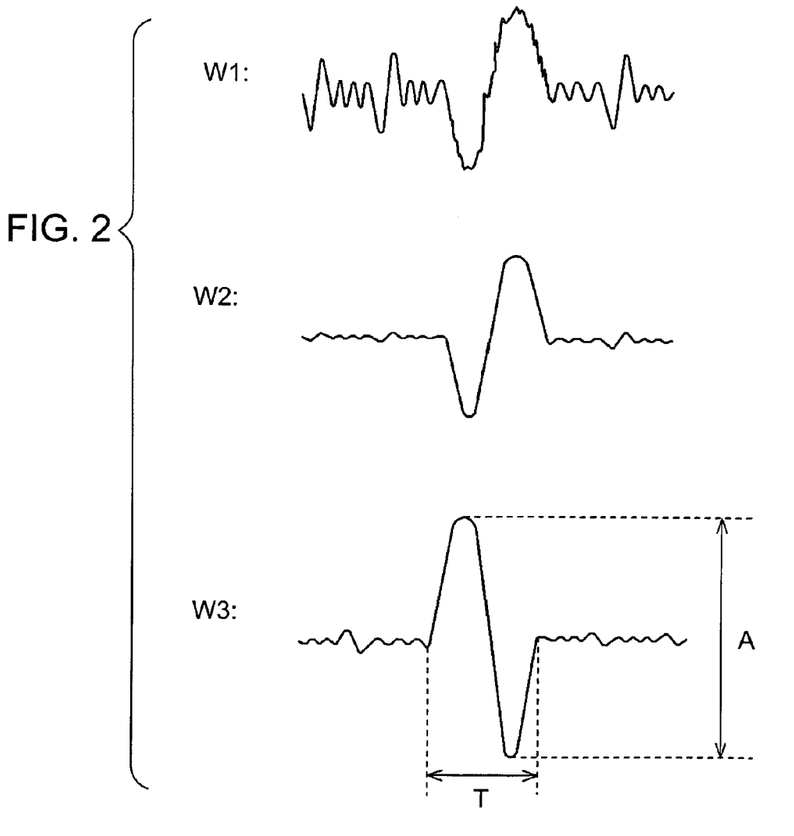
FIG. 2 is a waveform showing an example of a signal waveform at each point in the signal processing portion in FIG. 1.

FIG. 2 is a waveform showing an example of a signal waveform at each point in the signal processing portion 5 in FIG. 1. A waveform W1 in FIG. 2 is an output example of the piezoelectric sensor 1. The piezoelectric sensor 1 is installed to, e.g., a door edge or door frame of an automatic door, an edge of a door panel of an electric sliding door for a vehicle, or a vehicle body, along the shape thereof. The piezoelectric sensor 1, which is not a pressure sensitive sensor that has therein a plurality conductive wires, and that detects pinching based on a contact between the conductive wires, can be satisfactorily installed even on bended places as described above. Under a state where the piezoelectric sensor 1 has been installed, it is in statically stable conditions, and when it undergoes an external force such as vibrations or shocks, the piezoelectric material polarizes to thereby output a sinusoidal voltage signal.

The term "sinusoidal" is not limited to a so-called "sine wave", but includes so-called a "distorted wave" such as a superimposed wave comprising sine waves with a plurality of frequencies. The piezoelectric sensor 1 outputs a voltage, for example, with respect to vibrations due to a running automobile, besides with respect to pinching. In the case of an automatic door provided in a building, the piezoelectric sensor 1 may react to vibrations of a floor due to passersby. Including sensor outputs based on such various reactions, the piezoelectric sensor 1 outputs a sensor output like a waveform W1 shown in FIG. 2. Specifically, letting a sine wave having the largest amplitude and a low frequency to be a sensor output corresponding to an actual pinching state, the waveform W1 includes sine waves, as noise elements, having small amplitudes and a high frequency in large amounts. Furthermore, even the sine wave caused by pinching itself with the largest amplitude includes fine high frequency noises. Therefore, using such an output of the piezoelectric sensor 1 as it is, an erroneous detection may occur due to those noise elements.

With this being the situation, as shown in FIG. 1, the output voltage of the piezoelectric sensor 1 is inputted into the filter portion 2, and thereby a necessary frequency element is taken out alone through the filter portion 2. Nominated filters for taking out a necessary frequency element alone, are a band pass filter, low-pass filter, high-pass filter and the like. When an automatic door or electric sliding door for a vehicle pinches an object, the frequency of sin waves indicating a pinching state is typically 10 Hz or less. Hence, in this embodiment, if a low-pass filter having a cutoff frequency fc on the level of 10 Hz is used, the circuit configuration would become favorably simpler. The waveform W1, the input signal outputting from the piezoelectric sensor 1 into the filter portion 2, changes to a waveform W2, which is a waveform passing through the filter portion 2 as a low-pass filter shown in FIG. 2. As shown in FIG. 2, since eliminating high frequency elements such as vibration/noise elements due to running vehicles or passersby, a waveform of a sine wave substantially indicating a pinching state is exclusively extracted.

For the sake of facilitating understanding, in FIG. 2, an output waveform of the piezoelectric sensor 1 is represented by a large amplitude, but because the output voltage of a sensor is generally low, its amplification is required. In this embodiment, as shown in FIG. 1, a signal having passed through the filter portion 2 is amplified at the amplification portion 3 at an amplification factor Av. The signal after amplification is a waveform W3 shown in FIG. 2. In this embodiment, because an inverting amplifier circuit is used for the amplifier circuit (see FIG. 5), the sine wave of the waveform W3 is inverted.

Upon completion of amplification by the amplification portion 3, the amplified signal is determined by the determination portion 4. As shown in FIG. 2, the determination portion 4 evaluates the oscillation (wave height) A and period T of the waveform W3 after amplification, and for example, when the waveform W3 has an oscillation and period within a predetermined range, the determination portion 4 determines that an pinching has occurred.

On the evaluation of the oscillation A and period T, it is not necessarily required to measure an accurate oscillation and period, but the occurrence of pinching may be determined based on whether the measured value is in excess of a predetermined threshold values. Also, the occurrence of pinching may be estimated based on a transitioning state of a waveform. It is advisable to neglect too large amplitudes or too long periods, as errors. Upon determining pinching of an object in this manner, the detection result is outputted to alert means (such as a buzzer or display device of light-emitting diode (LED)) for warning of pinching, a control device of the opening/closing device and the like. The control device, upon receipt of this detection signal, temporarily stops the operation of the opening/closing device, or makes the opening/closing device to a reverse operation, and thereby performs control such as to alleviate or eliminate the pinching state.

As described above, the piezoelectric sensor 1 is a sensor using a piezoelectric material and taking advantage electric polarization based on the piezoelectric effect. Substances having the piezoelectric effect, for example, crystals such as quartz crystal, lead zirconate titanate, and barium titanate generally exhibit a pyroelectric property as well as the piezoelectric effect. As described above, the pyroelectric property is a property in which electric polarization appears when the temperature of a crystal changes. Hence, generally, pressure sensitive sensors using a piezoelectric material easily vary in its output with respect to the variation in ambient temperature. Also, when attempting to form the piezoelectric sensor 1 into a flat cord shape or a coaxial cable shape, the piezoelectric material is formed as a piezoelectric layer by combining resin or the like and piezoelectric ceramic or the like. As a result, when the rigidity of the piezoelectric layer varies due to the ambient temperature, the way of external force application to the piezoelectric sensor 1 varies. In other words, the output of the piezoelectric sensor 1 easily varies with respect to the variation in temperature. Here, the "variation of output" refers to the variation in the oscillation of voltage and the frequency of electric signal, outputted by the piezoelectric sensor 1. Therefore, the influence of the variation in ambient temperature is a problem associated with both of the filter portion 2 and amplification portion 3. Hereinafter, countermeasures against this problem will be described for each of the filter portion 2 and amplification portion 3.

Figure 3:
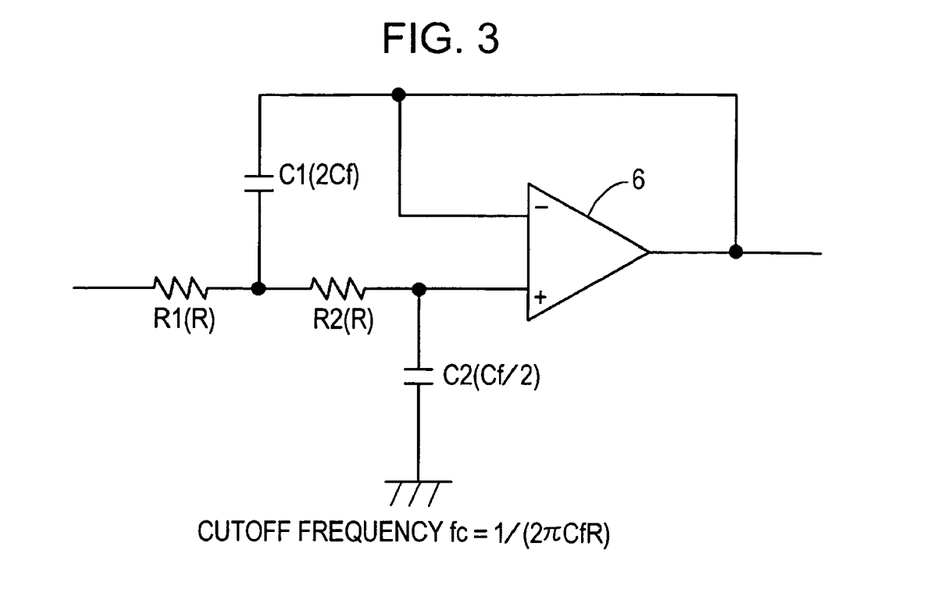
FIG. 3 is a circuit view showing an example of the filter portion in FIG. 1.

FIG. 3 is a circuit view showing an example of the filter portion 2 in FIG. 1. As shown in FIG. 3, the filter portion 2 comprises a voltage-sourced type low-pass filter by an operational amplifier 6. Its cutoff frequency fc as a frequency characteristic is expressed by the following expression (1).

$$fc = 1/(2 \times \pi \times Cf \times R) \quad (1)$$

As shown in FIG. 3, resistors R1 and R2 have the same resistance value R. The capacitance value of a capacitor C1 is ($2 \times Cf$), and that of a capacitor C2 is $Cf/2$.

Figure 4:
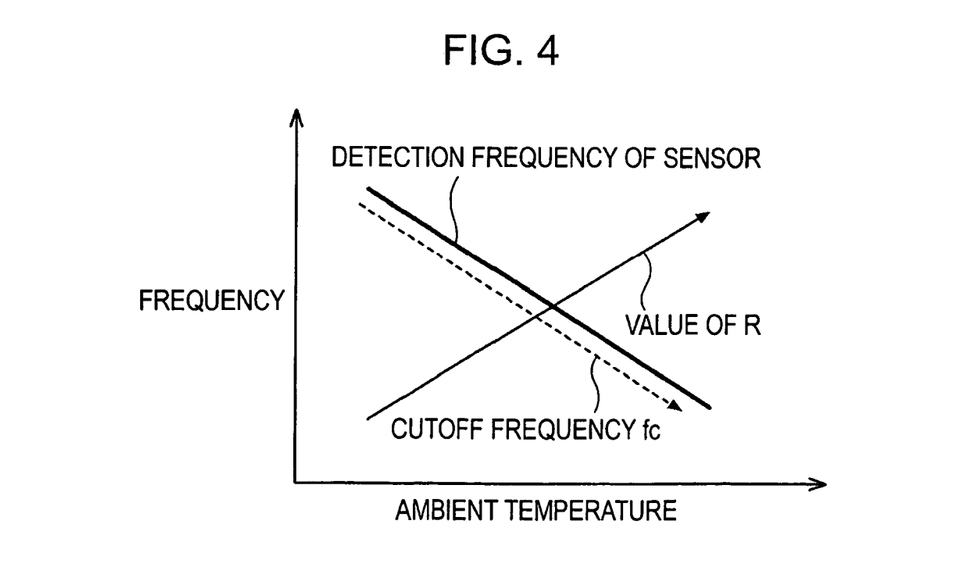
FIG. 4 is a graph showing a temperature characteristic of the filter portion in FIG. 3.

In this embodiment, as shown in FIG. 4, the detection frequency of the piezoelectric sensor 1 decreases as the ambient temperature increase. This is because the rigidity of the piezoelectric layer decreases(soften) as the temperature increases. Specifically, when the ambient temperature increases, the rigidity of the piezoelectric layer, which is a mixture of resin and piezoelectric ceramic, decreases. As a result, the stress with respect to the external force becomes small, resulting in a reduced output. Also, since the piezoelectric layer becomes softer, the change of the stress becomes slower, and thereby the frequency of output decreases. Conversely, when the ambient temperature decreases, the output increases, and thereby the frequency of output increases. Thus, in this embodiment, since the detection frequency at the time when an object has been pinched decrease as the ambient temperature increases, it is necessary that the cutoff frequency fc be shifted to the lower frequency side as temperature increases. It is indicated by a dotted line arrow in FIG. 4. In order to lower the cutoff frequency fc, it is advisable to increase the value of the constant Cf or R in the above expression (1). Here, since the resistance value R is the same between the resistors R1 and R2, the value R common to these resistors is varied. It is necessary that the resistance value of these resistors increases as the ambient temperature increases. It is therefore advisable to compose a low-pass filter shown in FIG. 3, using resistors having such a temperature characteristic.

As resistors for constructing the low-pass filter in the filter portion 2, thermistors may be employed. The thermistor is a resistor of which the resistance value significantly varies with the variation in temperature. Products thereof that have been precisely standardized regarding the variation of the resistance value thereof with respect to the temperature variation, are accessible. Therefore, the use of thermistors having a resistance value characteristic of the piezoelectric sensor 1 in response to the temperature variation, enables the filter portion 2 to be satisfactorily composed. Thermistors include NTC thermistors, in which the resistance value decreases as the temperature increases, and PTC thermistors, in which the resistance value increases as the temperature increases. In the above-described example, since it is essential only that the resistance value increase as the temperature increase, it is advisable to use the PCT thermistors here. The PCT thermistors are made from barium titanate. As described above, as a piezoelectric material constituting the piezoelectric sensor 1, barium titanate is often employed. Hence, in order that the characteristics of the piezoelectric material and thermistor well conforms to each other, the piezoelectric sensor 1 composed of the same composition may be used.

Hereinbefore, regarding the temperature compensation of the filter portion 2, the method has been described in which the circuit constants of the resistors in the low-pass filter circuit is caused to follow the ambient temperature. However, instead of the constants of the resistors, the constants of capacitors may be caused to follow the ambient temperature. Even in the case of a filter circuit other than the low-pass filter circuit, or even in the case where a filter is composed by a combination between other passive elements, a temperature compensation based on the same inventive concepts can be provided. For example, in this embodiment, the filter is composed by the CR circuit using the capacitors and resistors, but the same holds true for the cases where the filter is composed of: a) an LC circuit using inductors (L) and capacitors; b) a LR circuit using inductors and resistors; and c) an LCR circuit including all of inductors, capacitors, and resistors. Specifically, when the frequency band such as the cutoff frequency fc is determined by a combination of any two or all of resistance values of resistive elements (resistors, thermistors, and the like), capacitances of capacitive elements (capacitors), and inductances of inductive elements (inductors), it is possible to determine the frequency band in response to the ambient temperature, i.e., to change the frequency band in response to the ambient temperature by performing the following:

a) composing the resistive elements by resistive elements of which the resistance values each vary in response to the ambient temperature;

b) composing the capacitive elements by capacitive elements of which the capacitance values each vary in response to the ambient temperature;

c) composing the inductive elements by inductive elements of which the inductance values each vary in response to the ambient temperature; or d) combining any two or all of the above-described items (a), (b), and (c).

Figure 5:
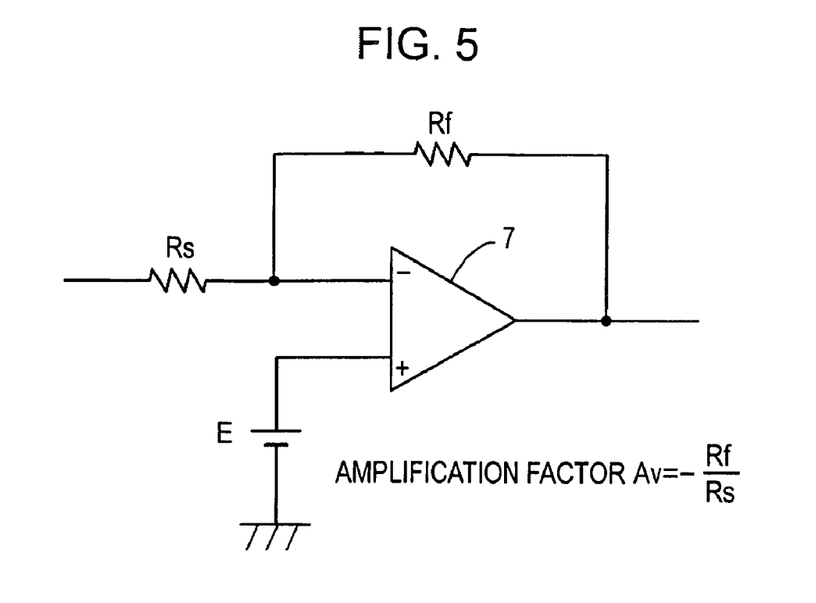
FIG. 5 is a circuit view showing an example of the amplification portion in FIG. 1.

Next, the amplification portion 3 will be explained. FIG. 5 is a circuit view showing an example of the amplification portion 3 in FIG. 1. In this embodiment, the amplification portion 3 is composed of an inverting amplifier circuit using an operational amplifier 7. A constant voltage E, shown in FIG. 5, shows an offset voltage for determining a virtual ground when the operational amplifier 7 is subjected to a single power source drive (ground to positive power source). An amplification factor Av of this inverting amplifier circuit is expressed by the following expression (2), wherein Av is expressed in a negative value because of inverting amplification.

$$Av = -Rf/Rs \qquad (2)$$

Figure 6:
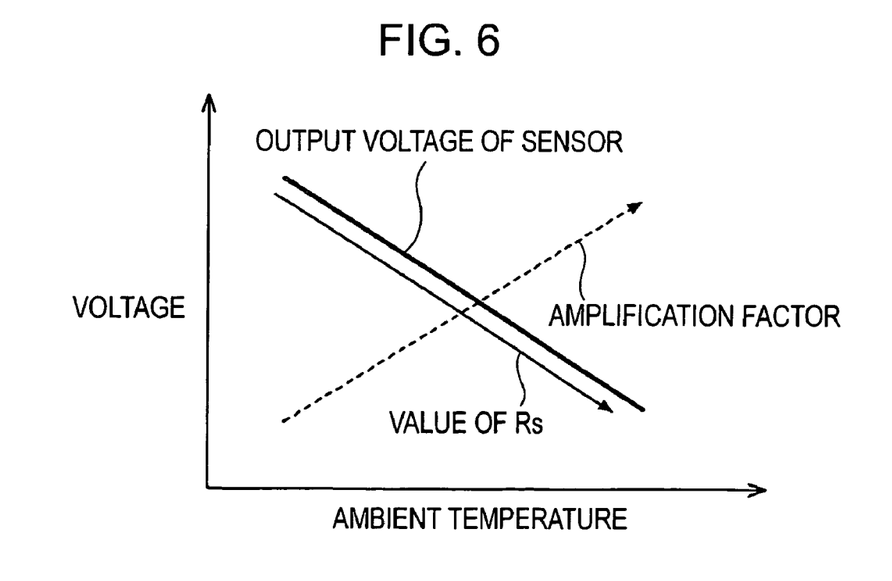
FIG. 6 is a graph showing a temperature characteristic of the amplification portion in FIG. 5.

As shown in FIG. 6, the output voltage of the piezoelectric sensor 1 decreases as the ambient temperature increases. This is attributable to, e.g., the decrease in the rigidity of the piezoelectric layer with respect to the temperature increase, and to the pyroelectric effect of the piezoelectric material. Since the detection voltage at the time when an object has been pinched decreases as the ambient temperature increases, it is necessary that the amplification factor Av of the amplification portion 3 is increased to a larger amplification factor, to follow the increase of the ambient temperature, as indicated by a dotted line arrow in FIG. 6. In order to increase the amplification factor Av, it is recommendable, for example, to increase the constant of the resistor Rf, or reduce that of the resistor Rs, in the above expression (2). Of course, both of the resisters Rs and Rf may be varied together. When attempting to vary the constant of the resistor Rf, it is advisable to compose the amplifier circuit using resistors having a temperature characteristic such that the resistance value increases as the temperature increases. Conversely, when attempting to vary the constant of the resistor Rs, it is advisable to compose the amplifier circuit using resistors having a temperature characteristic such that the resistance value decreases as the temperature increases.

As same in the case of the temperature compensation of the filter portion 2, thermistors may be used as resistors. As described above, thermistors include NTC thermistors, in which the resistance value decreases as the temperature increases, and PTC thermistors, in which the resistance value increases as the temperature increases. Accordingly, when attempting to utilize thermistors as resistors Rf, it is advisable to use PTC thermistors, and when attempting to utilize thermistors as resistors Rs, it is advisable to use NTC thermistors. Some thermistors linearly change in the resistance value with respect to the temperature variation, and others exponentially change in the resistance value with respect to the temperature variation. It is recommendable to select a kind and/or temperature characteristic of thermistors based on a required following characteristic of the amplification factor Av with respect to the ambient temperature. In this embodiment, an example in which the amplification portion 3 is composed using the inverting amplifier circuit has bee shown, but the amplification portion 3 may also be composed using a non-inverting amplifier circuit. For this case also, the inventive concepts that the amplification factor be increased in response to the increase in ambient temperature, hold true, as well.

By virtue of the above-described features, in the filter portion 2 and amplification portion 3, it is possible to compensate for the output of the piezoelectric sensor 1 varying with temperature. Therefore, the determination portion 4 shown in FIG. 1 can determine, based on an output from the amplification portion 3, whether an object has pinched in an opening/closing device, by evaluating the oscillation A and period T of the waveform of the output signal. For example, if the oscillation A is not lower than a predetermined voltage value, it can be determined that a sufficiently large vibration or shock has been applied. If the period T is on the level of a predetermined time period, or not more than the predetermined time period, it can be determined that the above-described vibration or shock is attributable not to running vehicles or passersby, but to pinching of an object. Upon detection of the pinching, the detection result is outputted.

The outputted detection result allows a wide range of application. For example, the detection result can be transferred to notification means that notifies that an object has been pinched in an opening/closing device. Here, "alert means" refers to, e.g., such as a display device of an LED or a buzzer. The detection result can also be transferred to a control device for controlling the opening/closing device. The control device, upon receipt of the detection signal, can early alleviate a force applied to the pinched object by stopping the operation of the opening/closing device or cause the opening/closing device to make a reverse operation.

Hereinbefore, descriptions have been made using examples in which, when attempting to change the frequency band (cutoff frequency fc) of the filter portion 2, it is changed to a lower frequency band in response to the increase in ambient temperature, and to a higher frequency band in response to the decrease in ambient temperature, and in which, when attempting to change the amplification factor Av of the amplification portion 3, it is changed to a higher amplification factor in response to the increase in ambient temperature, and to a lower amplification factor in response to the decrease in ambient temperature. However, the temperature dependence of the sensor is not restricted to the foregoing. Piezoelectric sensors and other kinds of sensors that have inverse temperature characteristics can also be addressed on the basis of the inventive concepts of the present invention.

The sensor to be used in the pinching detection device according to the present invention is not limited to a piezoelectric sensor, as long as it has temperature dependence and is capable of detecting pinching of an object, based on a frequency element and a magnitude of an output signal. That is, the present invention can produce a similar effect also by using another sensor. Here, "another sensor" may be a pressure sensitive sensor using a substance other than a piezoelectric material, but is not restricted to a dynamical sensor directly measuring a force due to pinching, unlike the pressure sensitive sensor belonging to this type of sensor. For example, it is also possible to compose a pinching detection device that detects a moving locus of the opening/closing device by irradiating the object with infrared light formed by combining pulses with mutually different frequencies, utilizing an optical sensor receiving direct light and reflected light of the infrared light, and determining conditions of transmission of the light with respect to the object including air, and/or conditions of reflection of the light on the surface of the object. Even in such an arrangement, the frequency band through which the infrared light passes and/or the attenuation factor can vary in accordance with the variation in ambient temperature. Therefore, composing a filter portion and an amplification portion of a pinching detection device in the same way as the present invention, allows a similar effect to be expected. Of course, the same holds true for the case where, using a substance other than a piezoelectric material, a pinching detection device having a temperature dependence and capable of detecting pinching of an object based on a frequency element and a magnitude of an output signal, is composed.

As described above, according to the present invention, it is possible to provide a pinching detection device capable of detecting pinching of an object, in a stable manner irrespective of variations in ambient temperature.

The present invention can be used as a pinching detection device for detecting that an object has been pinched in an automatic opening/closing device having an opening/closing state between a frame portion and a door portion, such as an automatic door or automatic revolving door in a building, electric sliding door in a vehicle, power window in a vehicle, electric hatchback door in a vehicle, or door in a railway vehicle, or between two door portions. Furthermore, even if the opening/closing device is of a manual type, the present invention can be incorporated into a safety device that cooperates with the opening/closing device and that operates a stopper function when pinching of an object has been detected, or a notification of the pinching is made after its detection.

What is claimed is:

1. A pinching detection device for detecting that an object has been pinched in an opening/closing apparatus, the pinching detection device comprising:
    a detection sensor having temperature dependence and detecting that an object has been pinched, based on a frequency element and a magnitude of an output signal;
    a filter portion for extracting a signal in a predetermined frequency band, from an output of the detection sensor;
    an amplification portion for amplifying the extracted signal,
    the predetermined frequency band from the filter portion being determined in response to an ambient temperature; and
    a determination portion for determining whether or not the object has been pinched by evaluating oscillation and period of a waveform of an output from the amplification portion.

2. The pinching detection device according to claim 1, wherein the frequency band is determined by a combination of any two or all of a resistance value of a resistive element, a capacitance of a capacitive element, and an inductance of an inductive element; and in order to determine the frequency band in response to the ambient temperature:

a) the resistive element is composed of a resistive element of which the resistance value varies in response to the ambient temperature;
b) the capacitive element is composed of a capacitive element of which the capacitance value varies in response to the ambient temperature;
c) the inductive element is composed of an inductive element of which the inductance value varies in response to the ambient temperature; or
d) any two or all of said (a), (b), and (c) are combined.

3. The pinching detection device according to claim 2, wherein the resistive element is a thermistor.

4. The pinching detection device according to claim 3, wherein the sensor is a piezoelectric sensor comprising a first electrode, a second electrode, and a piezoelectric material sandwiched between the two electrodes.

5. The pinching detection device according to claim 4, wherein the piezoelectric sensor is formed into a coaxial cable concentrically provided with a center electrode as the first electrode, an outer electrode as the second electrode, and the piezoelectric material sandwiched between the two electrodes.

6. The pinching detection device according to claim 2, wherein the sensor is a piezoelectric sensor comprising a first electrode, a second electrode, and a piezoelectric material sandwiched between the two electrodes.

7. The pinching detection device according to claim 6, wherein the piezoelectric sensor is formed into a coaxial cable concentrically provided with a center electrode as the first electrode, an outer electrode as the second electrode, and the piezoelectric material sandwiched between the two electrodes.

8. The pinching detection device according to claim 1, wherein the amplification factor is determined by a resistance value of a resistive element of which the resistance value varies in response to the ambient temperature.

9. The pinching detection device according to claim 8, wherein the resistive element is a thermistor.

10. The pinching detection device according to claim 8, wherein the sensor is a piezoelectric sensor comprising a first electrode, a second electrode, and a piezoelectric material sandwiched between the two electrodes.

11. The pinching detection device according to claim 10, wherein the piezoelectric sensor is formed into a coaxial cable concentrically provided with a center electrode as the first electrode, an outer electrode as the second electrode, and the piezoelectric material sandwiched between the two electrodes.

12. The pinching detection device according to claim 1, wherein the frequency band is determined by a combination of a resistance value of a resistive element of which the resistance value varies in response to the ambient temperature, and a capacitance of a capacitive element;
    and the amplification factor is determined by a resistance value of a resistive element of which the resistance value varies in response to the ambient temperature.

13. The pinching detection device according to claim 12, wherein the resistive element is a thermistor.

14. The pinching detection device according to claim 12, wherein the sensor is a piezoelectric sensor comprising a first electrode, a second electrode, and a piezoelectric material sandwiched between the two electrodes.

15. The pinching detection device according to claim 14, wherein the piezoelectric sensor is formed into a coaxial cable concentrically provided with a center electrode as the first electrode, an outer electrode as the second electrode, and the piezoelectric material sandwiched between the two electrodes.

16. The pinching detection device according to claim 1, wherein the sensor is a piezoelectric sensor comprising a first electrode, a second electrode, and a piezoelectric material sandwiched between the two electrodes.

17. The pinching detection device according to claim 16, wherein the piezoelectric sensor is formed into a coaxial cable concentrically provided with a center electrode as the first electrode, an outer electrode as the second electrode, and the piezoelectric material sandwiched between the two electrodes.

18. A pinching detection device according to claim 1, wherein an amplification factor of the amplification portion is determined in response to the ambient temperature.

* * * * *